(12) United States Patent
Wimmer (10) Patent No.: US 11,052,735 B2
(45) Date of Patent: Jul. 6, 2021

(54) WIND DEFLECTOR AND ROLLER BLIND PANEL OF AN AUTOMOBILE AND METHOD FOR PRODUCING A FUNCTIONAL ELEMENT

(71) Applicant: WEBASTO SE, Stockdorf (DE)

(72) Inventor: Rudolf Wimmer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 214 days.

(21) Appl. No.: 15/580,219

(22) PCT Filed: May 19, 2016

(86) PCT No.: PCT/EP2016/061270
§ 371 (c)(1),
(2) Date: Dec. 6, 2017

(87) PCT Pub. No.: WO2016/198247
PCT Pub. Date: Dec. 15, 2016

(65) Prior Publication Data
US 2018/0178638 A1    Jun. 28, 2018

(30) Foreign Application Priority Data
Jun. 11, 2015 (DE) .......................... 102015109279.4

(51) Int. Cl.
*B60J 7/00* (2006.01)
*B60J 7/22* (2006.01)
(Continued)

(52) U.S. Cl.
CPC ............. *B60J 7/0023* (2013.01); *B29C 39/10* (2013.01); *B29C 39/18* (2013.01); *B60J 7/0015* (2013.01);
(Continued)

(58) Field of Classification Search
CPC . B60J 7/0023; B60J 7/0015; B60J 7/22; B60J 1/2041; B29C 39/18; B29C 39/10;
(Continued)

(56) References Cited

U.S. PATENT DOCUMENTS 3,017,927 A * 1/1962 Demko ................... E06B 9/582
160/271
5,085,914 A * 2/1992 Perdelwitz, Jr. ........ A47L 13/16
428/137
(Continued)

FOREIGN PATENT DOCUMENTS

DE         19724592 C1   10/1998
DE      102004004407 A1    8/2005
(Continued)

OTHER PUBLICATIONS

International Search Report for PCT/EP2016/061270 dated Dec. 22, 2016 and English translation submitted herewith (7 Pages).
(Continued)

*Primary Examiner* — Daniel P Cahn
*Assistant Examiner* — Abe Massad
(74) *Attorney, Agent, or Firm* — Fitch, Even, Tabin & Flannery, LLP (57) ABSTRACT

A method for producing a functional element of an automobile that can be folded and/or wound up, having the steps of providing a fabric that can be folded and/or wound up, arranging the fabric on an application table or in a casting tool in a level arrangement and molding at least one edge strip made of a polyurethane material to the fabric under atmospheric pressure. Furthermore, a wind deflector element of an automobile is provided to a roller blind panel of an automobile, each comprising a fabric that can be folded
(Continued)

and/or wound up and that is provided with an edge strip made of a polyurethane material and forming an edge reinforcement.

27 Claims, 8 Drawing Sheets (51) Int. Cl.
| | |
|---|---|
| *B29C 39/18* | (2006.01) |
| *B29C 39/10* | (2006.01) |
| *B29K 75/00* | (2006.01) |
| *B60J 1/20* | (2006.01) |
| *B29C 39/30* | (2006.01) |
| *B29K 105/08* | (2006.01) |
| *B29C 39/00* | (2006.01) |
| *B29C 31/04* | (2006.01) |
| *B29L 12/00* | (2006.01) |
| *B29L 31/30* | (2006.01) |

(52) U.S. Cl.
CPC ............... *B60J 7/22* (2013.01); *B29C 31/045* (2013.01); *B29C 39/006* (2013.01); *B29C 39/30* (2013.01); *B29C 2793/009* (2013.01); *B29K 2075/00* (2013.01); *B29K 2105/0809* (2013.01); *B29K 2995/007* (2013.01); *B29L 2012/00* (2013.01); *B29L 2031/3052* (2013.01); *B60J 1/2041* (2013.01)

(58) Field of Classification Search
CPC ............... B29C 31/045; B29C 39/006; B29C 2793/009; B29C 39/30; B29C 2031/3052
See application file for complete search history.

(56) References Cited

U.S. PATENT DOCUMENTS

| | | | | |
|---|---|---|---|---|
| 6,341,810 B2* | 1/2002 | Hartmann | ............... | B29C 65/70 |
| | | | | 296/107.01 |
| 7,096,549 B2* | 8/2006 | Coffield | ................. | A47C 7/282 |
| | | | | 29/450 |
| 7,387,329 B2* | 6/2008 | Mollick | ................. | B60J 1/2025 |
| | | | | 296/138 |
| 8,377,358 B2* | 2/2013 | Keenihan | .......... | B29C 45/14336 |
| | | | | 264/275 |
| 8,398,146 B2* | 3/2013 | Just | ........................ | B60J 1/1815 |
| | | | | 296/107.07 |
| 8,789,879 B2* | 7/2014 | Sawada | ....................... | B60J 7/22 |
| | | | | 296/217 |
| 8,955,575 B2* | 2/2015 | Glasl | ...................... | B60J 1/2041 |
| | | | | 160/273.1 |
| 8,993,061 B2* | 3/2015 | Jones | ................. | A43B 23/0235 |
| | | | | 427/288 |
| 10,132,117 B2* | 11/2018 | Munsters | .................. | E06B 9/40 |
| 10,695,992 B2* | 6/2020 | Lisagor | .................. | B29C 70/78 |
| 2001/0035665 A1 | 11/2001 | Hartmann et al. | | |
| 2006/0204722 A1 | 9/2006 | Franzgrote | | |
| 2009/0145559 A1 | 6/2009 | Glasl et al. | | |
| 2009/0178771 A1* | 7/2009 | Lin | ........................ | B60J 7/0015 |
| | | | | 160/370.22 |
| 2012/0295034 A1 | 11/2012 | Link et al. | | |
| 2013/0038083 A1 | 2/2013 | Ascher | | |
| 2015/0321434 A1* | 11/2015 | Sterman | ................ | B29C 70/745 |
| | | | | 264/255 |
| 2016/0185041 A1* | 6/2016 | Lisagor | ................. | B29C 64/118 |
| | | | | 264/257 |
| 2016/0257184 A1* | 9/2016 | Van Boxtel | ............ | B60J 7/0015 |
| 2018/0339445 A1* | 11/2018 | Loveder | ................... | A43D 3/02 |

FOREIGN PATENT DOCUMENTS

| | | |
|---|---|---|
| DE | 102010000088 A1 | 7/2011 |
| DE | 102011120953 A1 | 11/2012 |
| EP | 1977923 A2 | 10/2008 |
| WO | 2005/012040 A1 | 2/2005 |
| WO | 2006/053520 A2 | 5/2006 |

OTHER PUBLICATIONS

International Preliminary Report on Patentability issued against International Application No. PCT/EP2016/061270 dated Dec. 12, 2017.

* cited by examiner

WIND DEFLECTOR AND ROLLER BLIND PANEL OF AN AUTOMOBILE AND METHOD FOR PRODUCING A FUNCTIONAL ELEMENT

CROSS-REFERENCE TO RELATED APPLICATIONS

This application is a U.S. national phase application filed under 35 U.S.C. § 371 of International Application No. PCT/EP2016/061270, filed May 19, 2016, designating the United States, which claims priority from German Patent Application No. 10 2015 109 279.4, filed Jun. 11, 2015, which are hereby incorporated herein by reference in their entirety for all purposes.

FIELD

The invention relates to a method for producing a functional element of an automobile that can be folded and/or wound up and to a wind deflector and a to a roller blind panel of an automobile.

BACKGROUND

From practice, a spreadable wind deflector mesh of a wind deflector arrangement of a roof opening system and a roller blind panel of a roller blind arrangement are known, the latter forming a shading means for a transparent section of an automobile roof. Functional elements of this kind each comprise a fabric that can be folded and/or wound up and which, in the case of a wind deflector, can in particular be made of a woven fabric or mesh permeable to air and, in the case of a roller blind panel, can be made of an opaque woven fabric, a film, a composite film or another type of composite material.

At their edges, wind deflector meshes are typically provided with beadings and/or reinforcement strips by means of which the wind deflector mesh in question can be connected to a deployable deployment clip and to a base of the wind deflector arrangement in question, said base being fixed to the vehicle. So far, the beadings or reinforcement strips have typically been sewn to the wind deflector mesh by hand. This is a cost-intensive process, which additionally compromises the appearance of the wind deflector mesh because of the visibility of the resulting seams. Moreover, the manual sewing process tends to yield insufficient process-reliable accuracy to dimension of the resulting component.

Alternatively, it is known for wind deflector meshes to be provided with beadings forming edge strips by injection-molding, i.e. for the wind deflector meshes to be placed in an injection-molding tool, where plastic material is introduced under pressure into a cavity, thus molding the beading to the wind deflector mesh. However, the use of an injection-molding process for producing the beadings, i.e. the edge strips, involves high tool costs, which, in turn, complicates adjusting the tool in case of a change of fabric dimensions.

One object of the invention is to provide a method for producing a functional element of an automobile that can be folded and/or wound up and that can be realized cost-efficiently. Another object of the invention is to provide a correspondingly realized wind deflector element and a correspondingly realized roller blind panel.

According to the invention, these objects are attained by the method having the features of claim 1, by the wind deflector element having the features of claim 19 and by the roller blind panel having the features of claim 29.

Thus, according to the invention, a method for producing a functional element of an automobile that can be folded and/or wound up is proposed, comprising the steps of:
providing a fabric that can be folded and/or wound up;
arranging the fabric on an application table or in a casting tool in a level arrangement; and
molding at least one edge strip made of a polyurethane material to an edge of the fabric under atmospheric pressure.

Using a polyurethane material, which can be a casting resin and which is molded to the fabric without pressure, allows the functional element to be produced without visible seams and at low tool costs. No manual sewing process is required. The resulting functional element has no visible seams disturbing the appearance. The polyurethane material can be dispensed by means of a controlled dispensing head without being exposed to excess pressure and can thus be applied quickly by machine. This allows the method according to the invention to also be used in industrial-scale production processes and for small-volume series, as well.

Machine-based production also results in high dimensional accuracy for the edge strip molded to the fabric.

In a preferred embodiment of the method according to the invention, the fabric is unwound onto the application table from a fabric roll and is provided with the edge strip on the application table in particular while in the uncut state. The fabric can be unwound from the fabric roll in a clocked manner by usual means, easily allowing for series production.

In a specific embodiment of the method according to the invention, after the edge strip has been molded to the fabric, the fabric is fed to a cutting unit, which cuts the fabric along the edge strip. The cutting unit can be integrated into the application table or can be a device connected downstream of the application table. In particular, the cutting unit is a die-cutting device whose cutting tool follows the shape of the edge strip.

In an alternative embodiment of the method according to the invention, the fabric is cut before the edge strip is molded to the fabric. It is also possible for the fabric to be unwound from a fabric roll, followed by the production of fabric cuts by means of a die-cutting device, for example, the fabric cuts being consequently provided with the at least one edge strip made of the polyurethane material.

The polyurethane material can be arranged on one side or on two sides of the fabric so as to form the edge strip. In the latter case, the polyurethane material permeates the fabric in particular during molding, the edge strip thus forming on both sides of the fabric.

When the edge strip is formed on both sides of the fabric, it is advantageous for the application table to have a molding groove into which the polyurethane material flows. In this case, the polyurethane material is applied to the fabric from above, for example, the polyurethane material flowing through the fabric and spreading throughout the molding groove. Once the polyurethane material has set, the resulting edge strip corresponds to the shape of the molding groove.

In an advantageous embodiment of the method according to the invention, the dispensing head by means of which the edge strip is produced is connected to a movement controller which defines a path of movement of the dispensing head during formation of the edge strip. This means that during formation of the edge strip, the dispensing head is moved across the fabric in such a manner that the edge strip is formed in the desired areas. The edge strip can be continuous or interrupted and it can entirely surround the fabric in a specific embodiment.

In order to be able to realize different functional sections of the edge strip, the hardness of the set edge strip is adjusted by adjusting the chemical composition of the polyurethane material in a specific embodiment of the method according to the invention. This, too, can take place through corresponding computer-assisted control of the dispensing head.

When a casting tool having a cavity for producing the edge strip is used, the polyurethane material flows without pressure from a dispensing head into the cavity of the casting tool.

For example, the casting tool has an elastic sealing lip along the cavity, under which a nozzle of the dispensing head is moved, allowing the polyurethane material to flow from the dispensing head into the cavity. Alternatively, the cavity can also be provided with an inlet channel or hot runner, via which the polyurethane material can flow from a dispensing head into the cavity.

The application table by means of which the method according to the invention is performed can be configured to have at least two dispensing heads. In this case in particular, it becomes possible for at least two functional elements of the same kind to be produced in parallel as per the method according to the invention.

The functional element that can be folded and/or wound up and that is produced as per the method executed according to the invention can be a wind deflector element, in particular a wind deflector mesh for a roof opening system.

The functional element that can be folded and/or wound up can also be a roller blind panel of a roller blind arrangement which is used in particular for shading a transparent roof section of an automobile or a side window or a rear window of an automobile.

In case of a roller blind panel, the edge strip can be a guiding element by means of which the roller blind panel is guided in a lateral guide rail of the roller blind arrangement, allowing the roller blind panel to be kept under tension perpendicular to the pullout direction.

Additionally, a constant force spring can be embedded into the lateral guiding element; this means that, in the method according to the invention, the constant force spring, which constitutes a winding spring for the roller blind panel, is connected to the fabric by molding the edge strip to the fabric.

Furthermore, the elastic edge strip can also be realized as a beading by means of which a roller blind panel can be connected to a winding shaft or to a pull bar or a wind deflector element can be connected to a deployment clip or to a base fixed to the vehicle.

SUMMARY

In a specific embodiment of the method according to the invention, in which a roller blind panel of a roller blind arrangement is produced, the edge strip being molded to the fabric is a winding core onto which the roller blind panel can be wound. If constant force springs, which can be made of spring steel or the like, are additionally connected to the fabric in this case, no other components are necessary in order to wind up the fabric. In fact, all elements ensuring the functioning of the roller blind are integrated in the roller blind panel, so that edge strips having the constant force springs only need to be introduced into corresponding lateral guide rails of the roller blind arrangement.

One subject-matter of the invention is a functional element of an automobile that can be folded and/or wound up and that is realized as a wind deflector element or as roller blind panel of a roller blind arrangement, comprising a fabric that can be folded and/or wound up and that is provided with an edge strip made of a polyurethane material and forming and edge reinforcement.

The polyurethane material is preferably a casting resin which can be attached to the fabric without pressure and thus without any elaborate tools, meaning without elaborate injection-molding tools.

The polyurethane material, i.e. the edge strip formed by the polyurethane material, can be arranged on one side or on both sides of the fabric. In the latter case, the fabric is preferably permeated by the edge strip.

The edge strip, which is applied to the fabric in particular by means of a dispensing head, can surround the entire circumference of the fabric or can be formed only in sections on the circumferential edge of the fabric.

Depending on its application, the fabric can be a mesh, a woven fabric or a composite film. The use of other materials and material combinations capable of being folded and/or wound up are contemplated for the fabric, as well.

In another specific embodiment of the functional element that can be folded and/or wound up according to the invention, at least one stiffening strip can integrally branch off from the edge strip, the stiffening strip extending in the direction of the center of the fabric. The stiffening strip, too, can be produced by means of the dispensing head that produces the edge strip. Stiffening strips of this kind may be necessary in particular if the functional element forms a mesh-type wind deflector element.

To meet the requirements of the respective application, the edge strip, which may be formed on the entire circumference of the fabric, can have zones of different hardness. If the fabric forms a wind deflector element, it can have an edge strip forming a beading and made of a hard component on each of a lower edge and an upper edge and an edge strip made of a soft component on each of the edges connecting the upper edge and the lower edge, which prevent the fabric from tearing at its edges while still allowing the wind deflector element to be folded. For example, the hard component has a hardness between 30 and 50 Shore D. The soft component has a hardness between 50 and 70 Shore A, for example. The hardness of the edge strip can be defined by corresponding material settings in the dispensing head which is preferably used to mold the edge strip to the fabric.

When the functional element forms a roller blind panel of a vehicle roller blind arrangement, the edge strip can be a guiding element that serves to laterally guide the roller blind panel in a corresponding guide rail of the roller blind arrangement and into which a constant force spring is preferably embedded, by means of which the roller blind panel can be wound up to form a roller blind reel. In this case in particular, the edge strip can be part of a lateral guide strip of the roller blind panel, the guide strip being connected to a central portion of the roller blind panel. The guide strip constitutes a so-called fabric module, which can be configured in a standardized manner irrespective of the design of the visible surface of the roller blind panel and which can be guided in a standardized guide rail of the roller blind arrangement so as to ensure standardized friction parameters.

The edge strip can form a beading for connecting the fabric to a retaining element, both when the functional element forms a wind deflector and when the functional element forms a roller blind panel. In case of a roller blind panel of a roller blind arrangement, the retaining element is in particular a pull bar or a winding shaft. In case of a wind deflector element, the retaining element is a base fixed to the vehicle or a wind deflector clip that can be deployed relative to the base fixed to the vehicle.

In order for the roller blind panel to be integral, the edge strip can also be a winding core, onto which the fabric can be wound. This leads to a reduced number of components because no separate winding core has to be provided.

Other advantages and advantageous embodiments of the subject-matter of the invention are apparent from the description, the drawing and the claims.

Examples of embodiments of a functional element that can be folded and/or wound up according to the invention and of methods for producing the same are illustrated in the drawing in a schematically simplified manner and are explained in more detail below.

DETAILED DESCRIPTION

Figure 1:
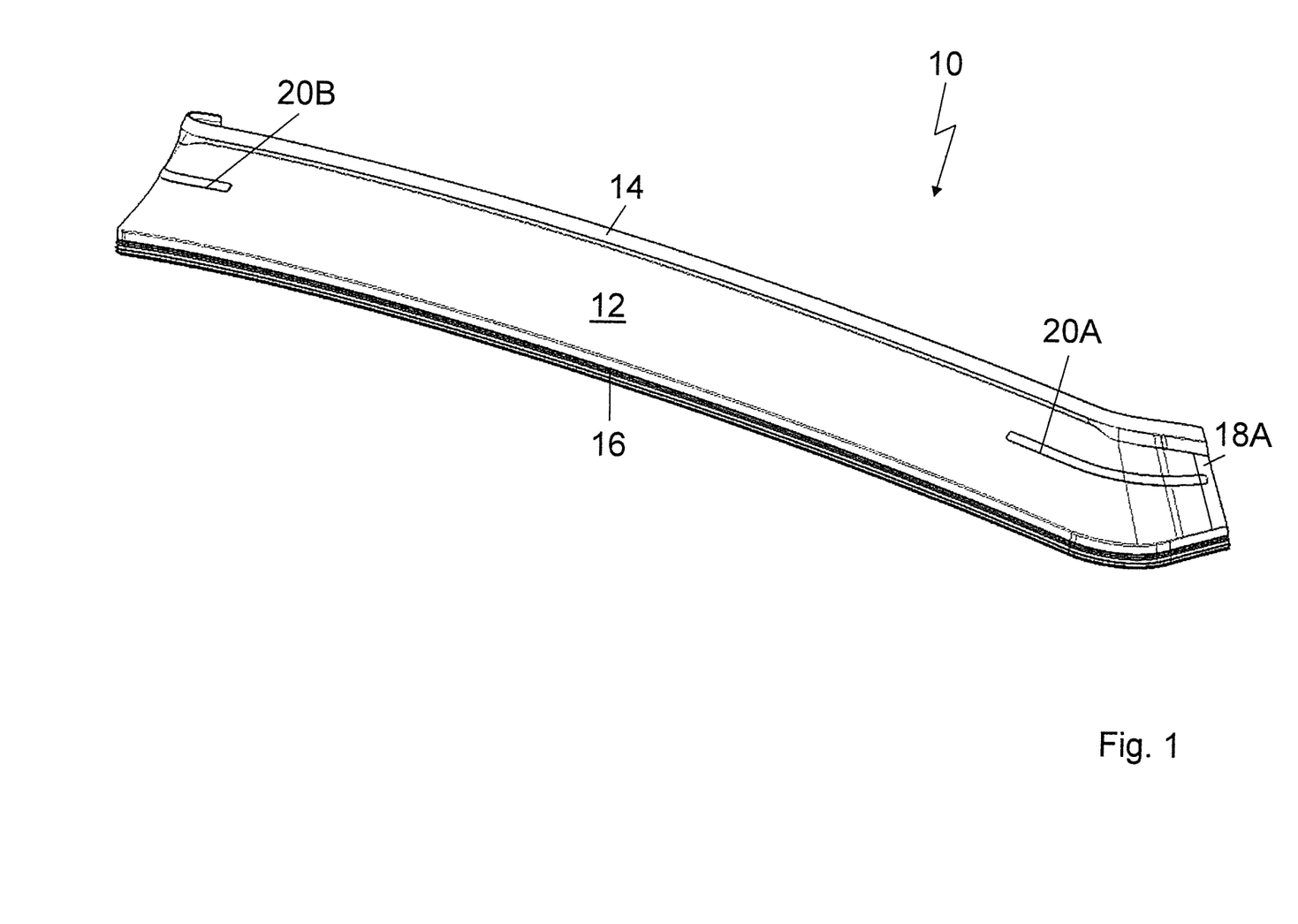
FIG. 1 shows a perspective illustration of a wind deflector element capable of being folded in its spread state.

FIG. 1 shows a wind deflector element 10 that is part of a wind deflector arrangement used in the area of a front edge of a roof opening for a roof opening system of an automobile. In addition to the wind deflector element 10, which is capable of being folded, the wind deflector has a base element (not illustrated) fixed to the roof and a pivotable deflector clip (not illustrated) pre-tensioned in the deployment direction by means of corresponding deployment springs.

The wind deflector element 10 comprises a foldable fabric 12 made of a mesh material and cut according to the requirements of the wind deflector arrangement. The fabric 12 has an upper edge, which is provided with a first beading 14 to be formed on the deflector clip, beading 14 constituting an edge strip, and a lower edge, which is provided with a second beading 16 to be formed on the base element, beading 16 also constituting an edge strip. The beadings 14 and 16 each extend along the longitudinal extension of the fabric 12, i.e. in the transverse direction of the vehicle in question, and extend up to the edges arranged on both sides and also provided with an edge strip 18A and 18B, respectively, each of said edge strips extending in the vertical direction when the fabric 12 is in the extended state and connecting the upper beading 14 to the lower beading 16. Furthermore, the wind deflector element 10 comprises two stiffening strips, each of which extends from one of the edge strips 18A and 18B in the direction of the center of the fabric, doing so at least approximately parallel to the upper edge strip forming beading 14.

Figure 2:
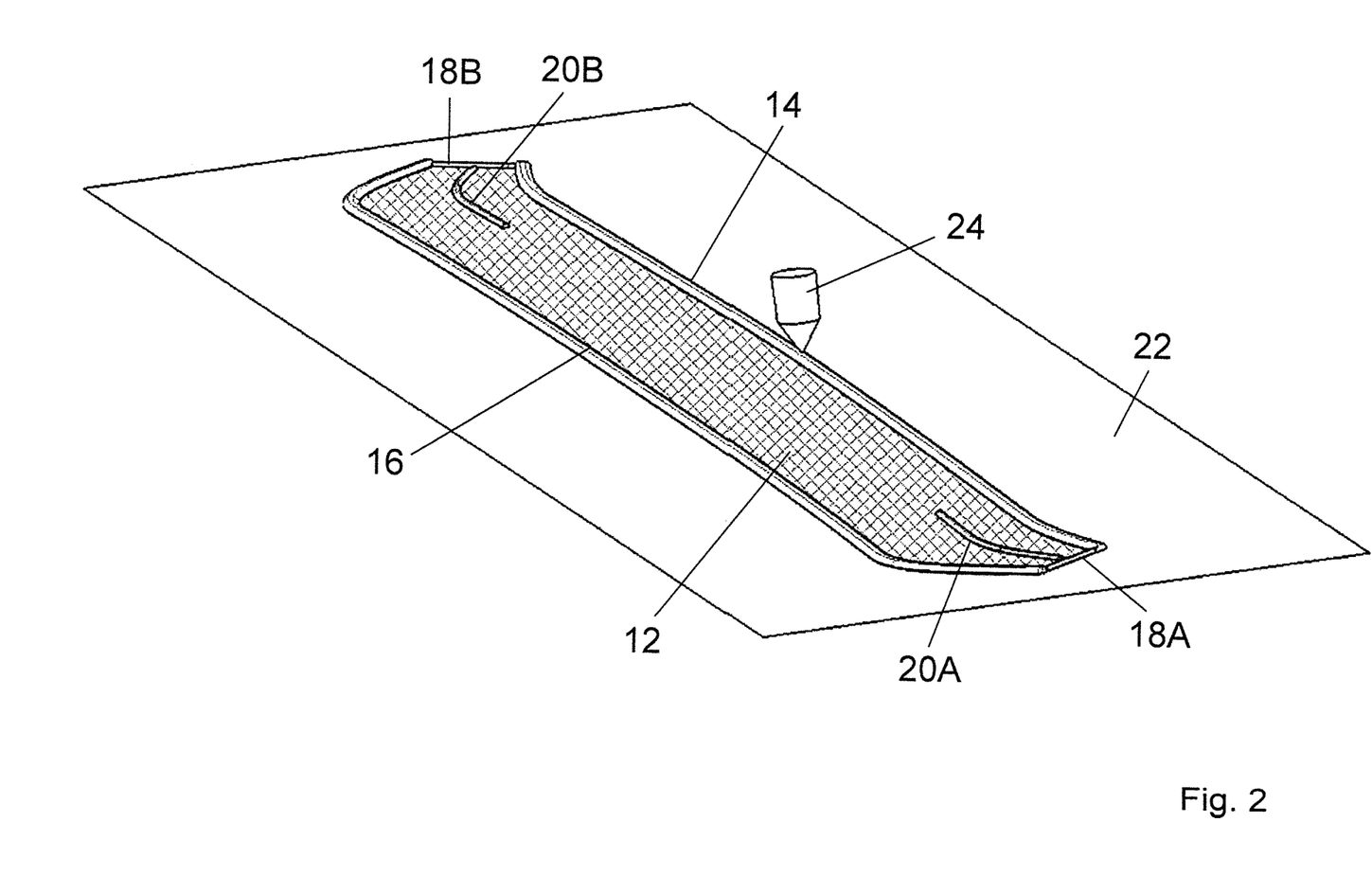
FIG. 2 shows edge strips being molded to a fabric of the wind deflector element of FIG. 1.

Production of the wind deflector element 10 illustrated in FIG. 1 is explained below with reference to FIG. 2.

First, a cut of the fabric 12 is placed on an application table in level arrangement and fixed, if required. Subsequently, a casting resin made of a polyurethane material is applied along the entire circumferential edge of the cut of the fabric 12 by means of a dispensing head 24, thus forming the two beadings 14 and 16 and the two lateral edge strips 18A and 18B. Additionally, the stiffening strips 20A and 20B are applied to the fabric 12 by means of the dispensing head 24. The viscosity of the polyurethane material applied to the fabric 12 can be adjusted by means of the dispensing head 24. The casting resin is applied without being subjected to pressure, i.e. it is under atmospheric pressure.

Since the hardness of the resulting material molded to the fabric 12 can also be adjusted by means of the dispensing head 24 by adjusting the composition, the beadings 14 and 16 are formed by a hard material having a hardness of about 35 Shore D, whereas the edge strips 18A and 18B, which are formed on the lateral edges, and the stiffening strips 20A and 20B are formed as a soft material having a hardness of about 60 Shore A. By being configured in this way, the wind deflector element 10 satisfies the requirements for folding and spreading when the wind deflector clip is actuated, while the beadings 14 and 16 ensure a secure connection to the deployment clip and the base element.

Figure 3:
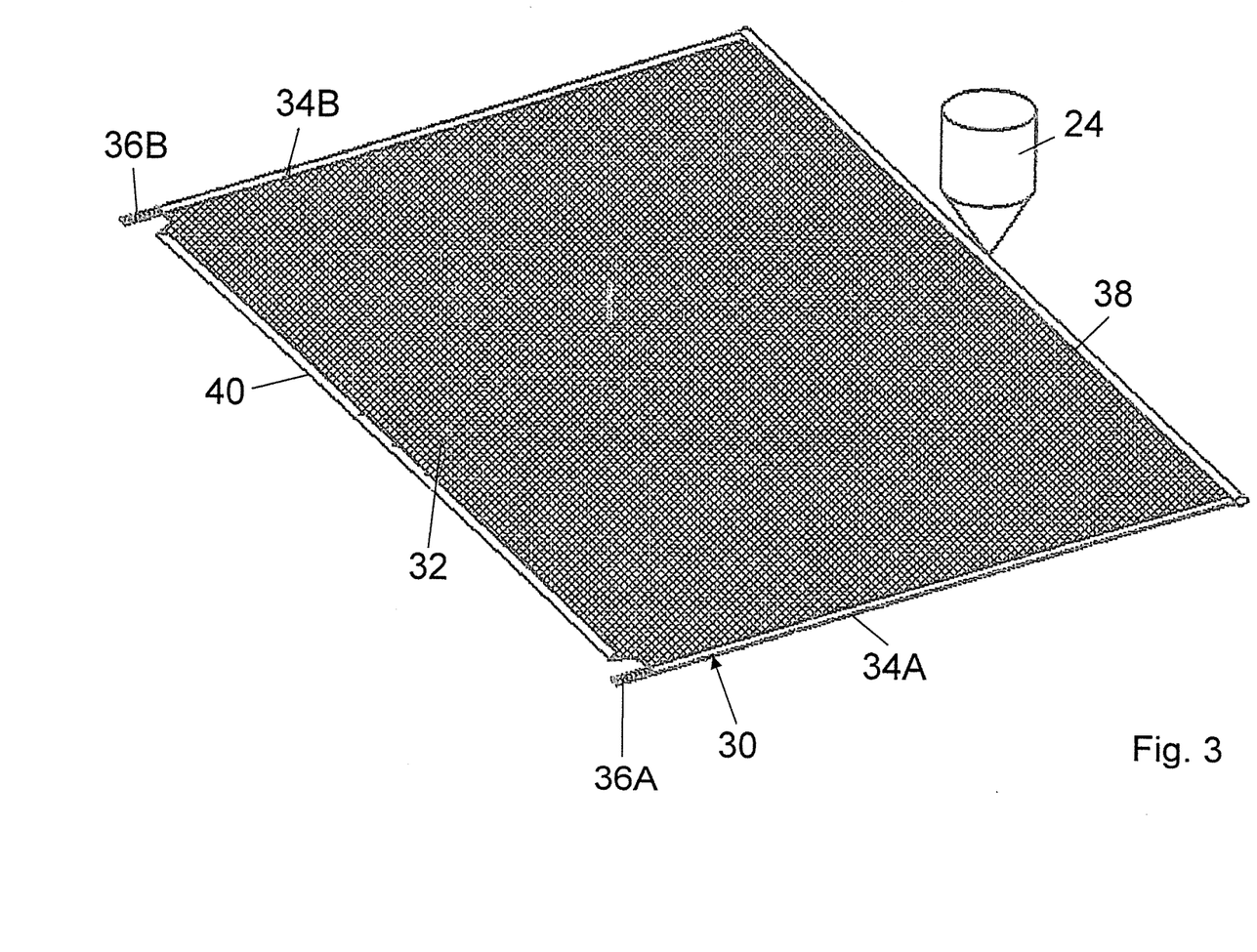
FIG. 3 shows a perspective illustration of a roller blind panel during formation of an edge strip.

FIG. 3 shows a roller blind panel 30 which is part of a roller blind arrangement (not described) of an automobile roof. The roller blind panel 30 comprises a fabric 32 capable of being wound up and made in particular of an opaque woven fabric. At each of its edges arranged on either side of a vertical longitudinal center plane of the roller blind, the fabric 32 is provided with an edge strip 34A and 34B, respectively, which is produced from a polyurethane material made of casting resin. A constant force spring 36A and 36B is embedded into each of the edge strips 34A and 34, respectively. The two constant force springs 36A and 36B serve as winding springs for the roller blind panel 30, enabling the latter to be wound onto a winding core 38, which is formed by an edge strip at a rear edge of the fabric 32 and interconnects the bilaterally arranged edge strips 34A and 34B. The winding core 38, too, is produced from a polyurethane casting resin molded to the fabric 32.

At its edge facing away from the winding core 38, the fabric 32 is provided with a beading 40, which also constitutes an edge strip and which allows the roller blind panel 30 to be connected to a pull bar (not illustrated). To connect the roller blind panel 30, the beading 40 engages into a corresponding beading groove of the pull bar. Together with the constant force springs 36A and 36B, the edge strips 34A and 34B each form lateral guiding elements of the roller blind panel 30, which can be guided in corresponding guide rails of the roller blind arrangement. By being guided at the sides, the extended portion of the roller blind panel 30 is tensioned in the transverse direction at all times.

The roller blind panel 30 is produced in the way described below.

First, a cut of the fabric 32 is placed in level arrangement on an application table. Additionally, the constant force springs 36A and 36B are placed against the fabric in their unwound state, i.e. in level arrangement as well. Subsequently, a polyurethane casting resin is molded to the fabric 32 along the edge of the fabric cut by means of a dispensing head 24 so as to form the edge strips. By controlling the dispensing head 24 accordingly, the winding core 38 is formed as a hard material having a hardness of 35 Shore D, the beading 40 is formed as a hard material having a hardness of 35 Shore D, and the edge strips 34A and 34B, in which the constant force springs 36A and 36B are embedded, are each formed as a soft material having a hardness of 60 Shore A. Once the casting resin molded to the fabric 32 without pressure by means of the dispensing head 24 has set, the finished roller blind panel 30 is removed from the application table so that it can be processed further or be installed.

Figure 4:
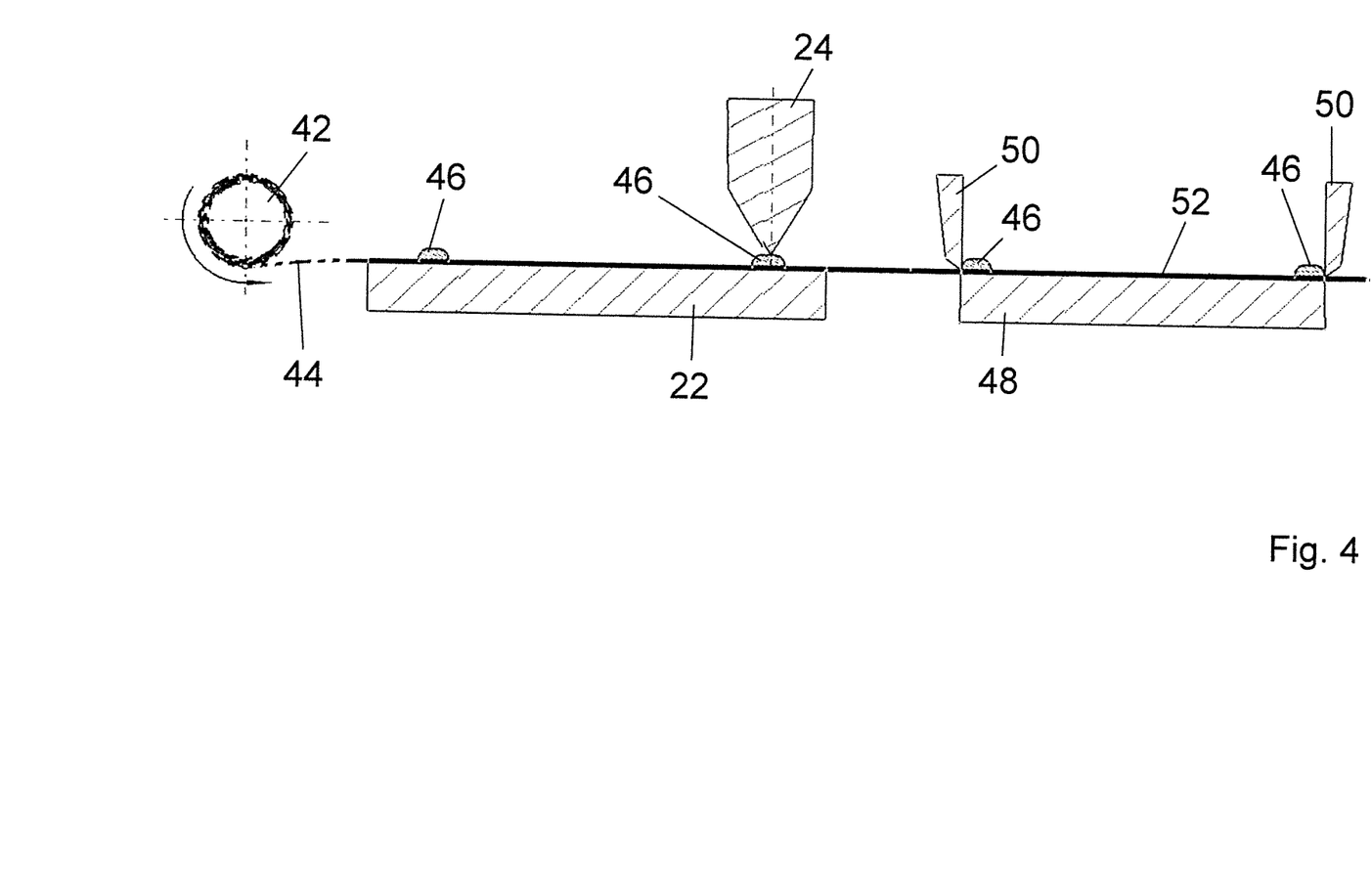
FIG. 4 shows an embodiment of a production method for a deflector element or for a roller blind panel in a side view.

In FIG. 4, production of a wind deflector element or of a roller blind panel is illustrated in a highly schematized manner. For this purpose, first, a fabric 44 capable of being wound up and folded and forming a mesh or woven fabric is provided on a fabric roll 42. The fabric 44 is unwound from the fabric roll 42 and conveyed to an application table 22. There, a circumferential edge strip 46 is produced by means of a dispensing head 24 from which a polyurethane casting resin is dispensed or flows without pressure, thus being applied onto the fabric 44 under atmospheric pressure so as to form the edge strip 46 in the manner of a bump having a shape defined by the dispensing head. Once the casting resin has set, the fabric 44 is transported to a cutting unit 48, where it is cut along the edges of the edge strip 46 by means of cutting dies 50. At the same time, a new section of the fabric 44 can be provided with an edge strip 46 at the application table 22. Subsequently, the resulting deflector element 52 or the resulting roller blind panel 52 can be removed from the cutting unit 48 in its finished state and can be processed further or be installed.

Figure 5:
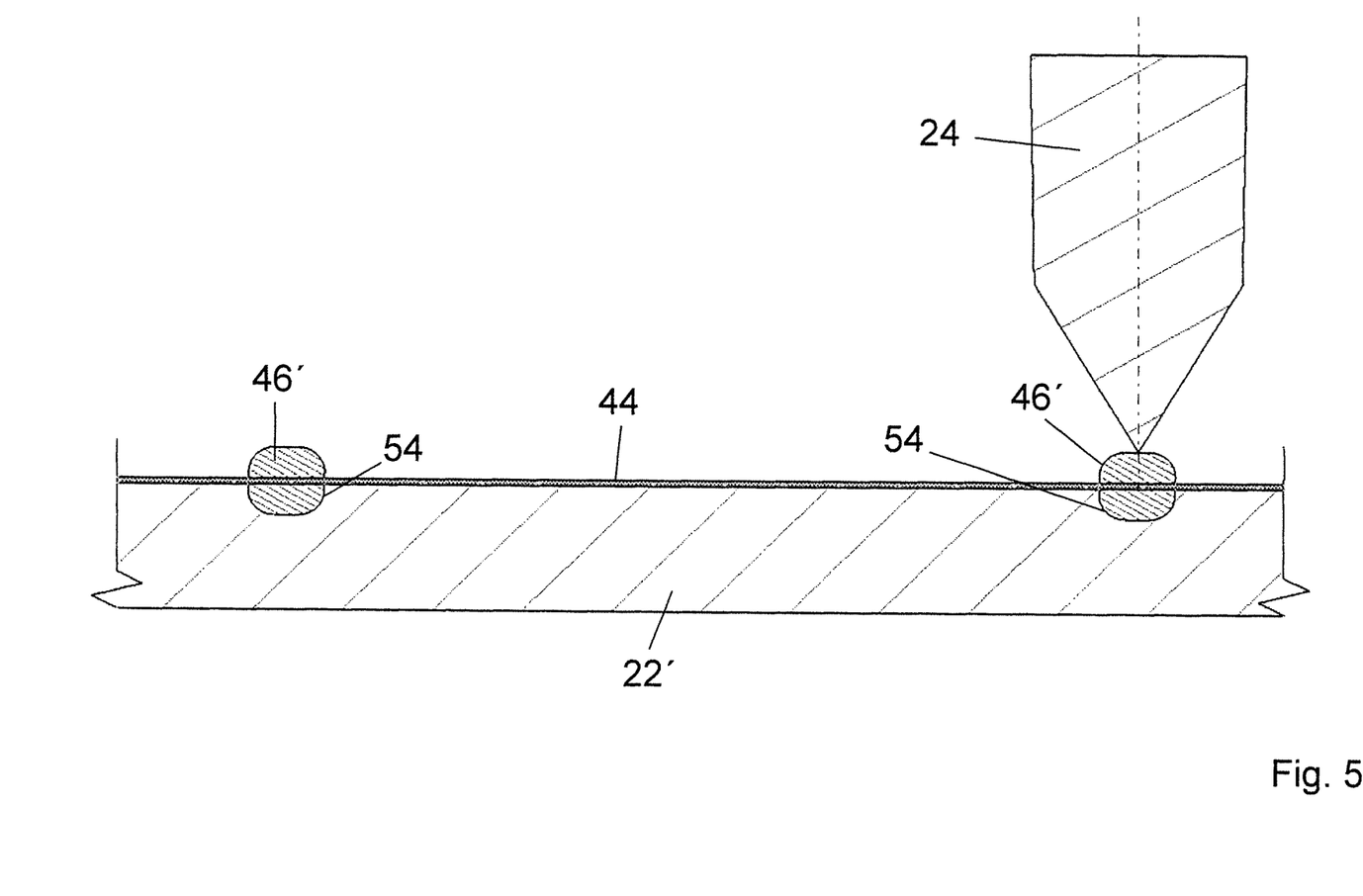
FIG. 5 shows an alternative embodiment of a production method for a functional element according to the invention.

FIG. 5 shows an alternative embodiment of an application table 22', which differs from the one of FIG. 4 in that it is provided with a molding groove 54 which allows providing the fabric 44 with an edge strip 46' that is formed on both sides of the fabric 44 and that permeates the fabric 44 when the casting resin is applied by means of the dispensing head 24. When the casting resin is applied to the upper side of the fabric 44, it flows through the fabric 44 into the molding groove 54, allowing the casting resin to set both in the molding groove 45 and at the upper side of the fabric 44. Once the edge strip 46' has set, the fabric 44 can be cut in a cutting unit, which may correspond to the cutting unit illustrated FIG. 4, for example.

Figure 6:
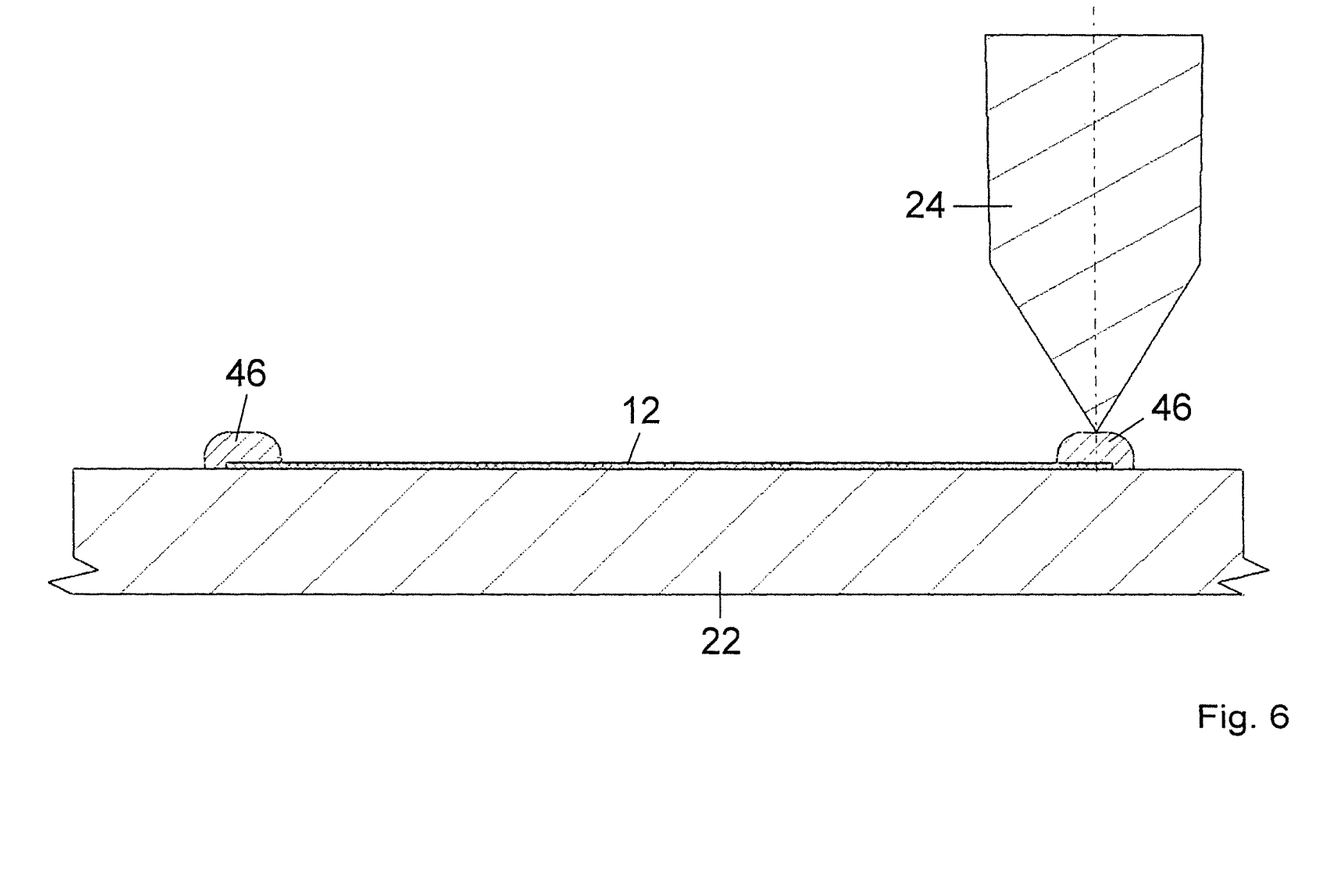
FIG. 6 shows another alternative embodiment of a production method for a functional element according to the invention.

FIG. 6 shows a cross-section of an application table 22 on which an edge strip 46 is formed on a previously cut fabric 12 by means of a dispensing head 24. As in the embodiments described above, the dispensing head 24 is moved along the edge of the fabric 12 by being controlled accordingly and by means of step motors, for example, so that the edge strip 46 can be formed on the circumference of the fabric 12, the edge strip 46 consisting of a polyurethane casting resin applied without pressure under atmospheric pressure.

Figure 7:
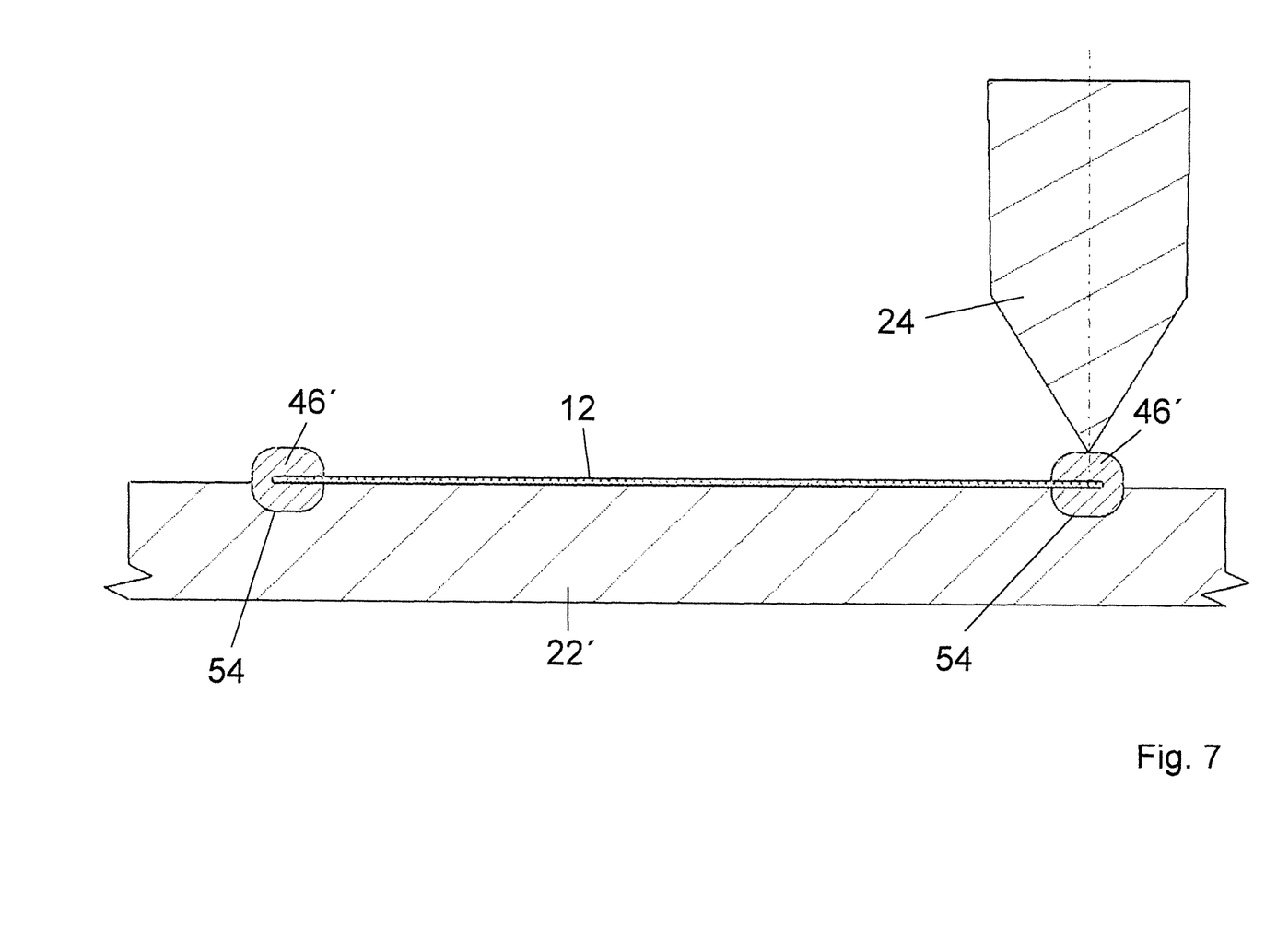
FIG. 7 shows another alternative embodiment of a production method for a functional element according to the invention.

FIG. 7 shows an application table 22' that corresponds at least largely to the application table shown in FIG. 5, thus also being provided with a molding groove 54 for forming a circumferential edge strip 46' on a fabric 12, the molding groove allowing the edge strip 46' to be molded to the upper side and to the underside of the fabric 12. However, the fabric 12 has already been cut according to a specific application when the edge strip 46' is molded on.

Figure 8:
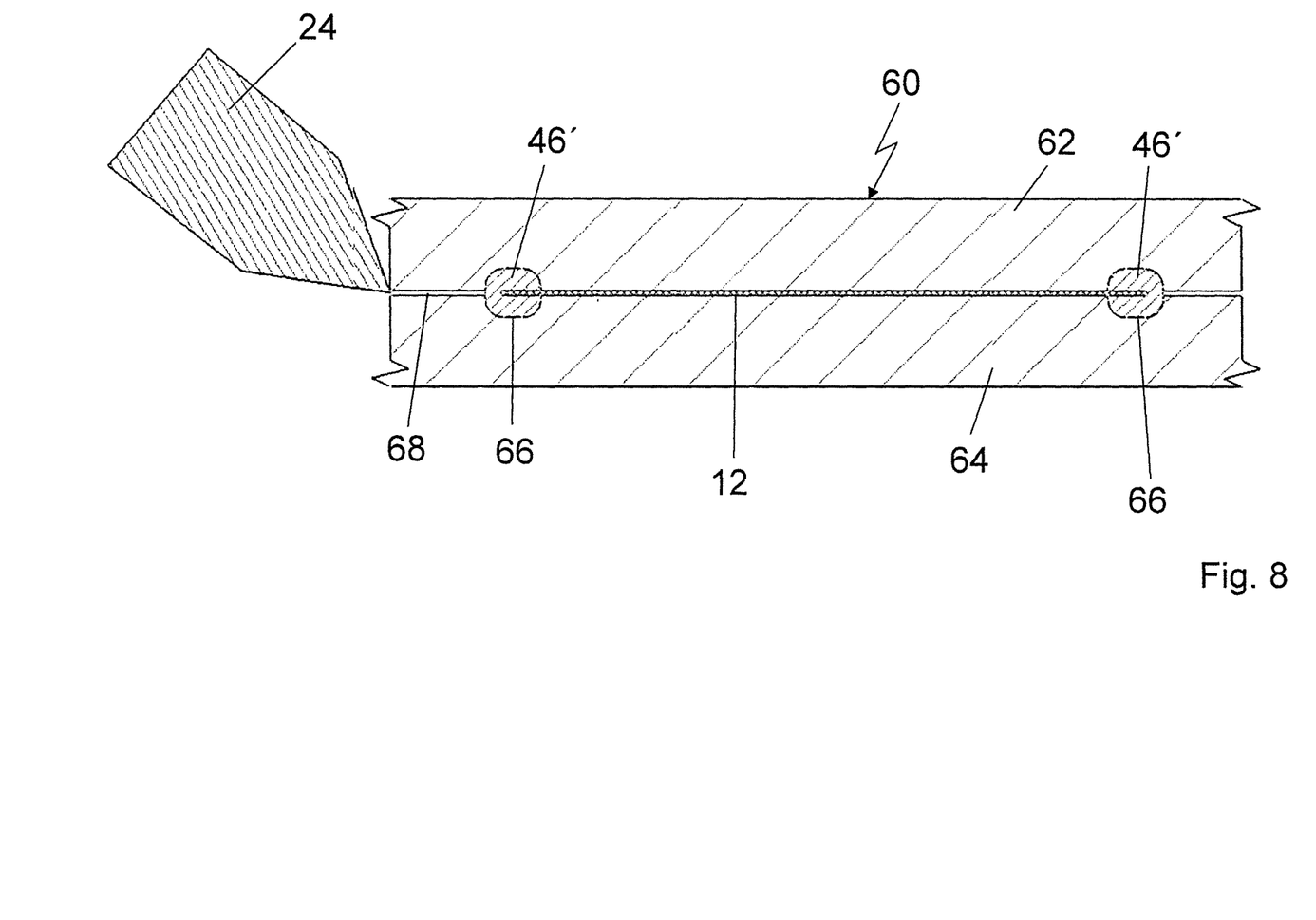
FIG. 8 shows another embodiment of a production method for a functional element according to the invention.

FIG. 8 shows a casting tool 60 comprising an upper tool 62 and a lower tool 64 which form a cavity 66 that serves to mold a circumferential edge strip made of a polyurethane casting resin to a cut of a fabric 12 arranged level in the casting tool 60. The polyurethane casting resin can flow into the cavity 66 via a dispensing head 24 and a channel 68 under atmospheric pressure and spread out there. Once the casting resin has set in the casting tool 60, the upper tool 62 and the lower tool 64 are separated, allowing the fabric 12 now provided with the edge strip 46' to be demolded.

REFERENCE SIGNS

10 wind deflector element
12 fabric
14 beading
16 beading
18A, B edge strip
20A, B stiffening strip
22 application table
24 dispensing head
30 roller blind panel
32 fabric
34A, B edge strip
36A, B constant force spring
38 winding core
40 beading
42 fabric roll
44 fabric
46 edge strip
48 cutting unit
50 cutting die
52 deflector element/roller blind panel
54 molding groove
60 casting tool
62 upper tool
64 lower tool
66 cavity
68 channel

The invention claimed is:

1. A method for producing a functional element of an automobile that can be folded or wound up, comprising the steps of:
   providing a fabric that can be folded or wound up;
   arranging the fabric on an application table in a level arrangement;
   molding at least one edge strip made of a polyurethane material to a level surface of the fabric under atmospheric pressure:
   wherein the edge strip is formed by a dispensing head which applies the polyurethane material onto the fabric in a controlled manner; and
   wherein the dispensing head, by means of which the edge strip is formed, is connected to a movement controller which defines a path of movement of the dispensing head during formation of the edge strip.

2. The method according to claim 1, wherein the fabric is unwound onto the application table from a fabric roll and is provided with the edge strip while in an uncut state on the application table.

3. The method according to claim 1, where after the edge strip has been molded on, the fabric is fed to a cutting unit and is cut along the edge strip.

4. The method according to claim 3, wherein the cutting unit is a die-cutting device.

5. The method according to claim 1, wherein the fabric is cut before the edge strip is molded on.

6. The method according to claim 1, wherein during molding, the polyurethane material permeates the fabric, thus forming the edge strip on both sides of the fabric.

7. The method according to claim 6, wherein the application table has a molding groove into which the polyurethane material flows.

8. The method according to claim 1, wherein the hardness of the edge strip is adjusted by adjusting the composition of the polyurethane material.

9. The method according to claim 1, wherein the edge strip is formed in such a manner that it has zones of different hardness.

10. The method according to claim 1, wherein the polyurethane material flows without pressure from the dispensing head into a cavity of the casting tool.

11. The method according to claim 1, wherein the polyurethane material is a casting resin.

12. The method according to claim 1, wherein the functional element that can be folded or wound up is a wind deflector element comprising a mesh material.

13. The method according to claim 1, wherein the functional element that can be folded or wound up is a roller blind panel of a roller blind arrangement.

14. The method according to claim 13, wherein the edge strip is a guiding element into which a constant force spring is embedded.

15. The method according to claim 13, wherein the edge strip is a beading for connecting the roller blind panel to a winding shaft or to a pull bar.

16. The method according to claim 13, wherein the edge strip is a winding core onto which the roller blind panel can be wound.

17. A method for producing a functional element of an automobile that can be folded or wound up, comprising the steps of:
provinding a fabric that can be folded or wound up;
arranging the fabric on an application table in a level arrangement;
molding at least one edge strip made of a polyurethane material to the fabric under atmospheric pressure:
wherein the edge strip is formed by a dispensing head which applies the polyurethane material onto the fabric in a controlled manner; and
wherein the dispensing head, by means of which the edge strip is formed, is connected to a movement controller which defines a path of movement of the dispensing head during formation of the edge strip,
wherein the functional element that can be folded or wound up is a wind deflector element having zones of different hardness by forming the edge strip with a beading made of a hard component on each of a lower edge and an upper edge of the edge strip and a soft component connecting the upper edge and the lower edge.

18. The method of claim 17, wherein the hard component has a hardness between 30 and 50 Shore D and the soft component has a hardness between 50 and 70 Shore A.

19. A method for producing a functional element of an automobile that can be folded or wound up, comprising the steps of:
providing a fabric that can be folded or wound up;
arranging the fabric on an application table in a level arrangement;
molding at least one edge strip made of a polyurethane material to the fabric under atmospheric pressure:
wherein the edge strip is formed by a dispensing head which applies the polyurethane material onto the fabric in a controlled manner; and
wherein the dispensing head, by means of which the edge strip is formed, is connected to a movement controller which defines a path of movement of the dispensing head during formation of the edge strip.
wherein the functional element that can be folded or wound up is a wind deflector element or roller blind panel having zones of different hardness by forming the edge strip with a beading made of a hard component on each of a lower edge and an upper edge of the edge strip and a soft component connecting the upper edge and the lower edge.

20. The method according to claim 19, wherein during molding, the polyurethane material permeates the fabric, thus forming the edge strip on both sides of the fabric.

21. The method according to claim 19, wherein the application table has a molding groove into which the polyurethane material flows.

22. A method for producing a functional element of an automobile that can be folded or wound up, comprising the steps of:
providing a fabric that can be folded or wound up;
arranging the fabric on an application table in a level arrangement;
molding at least one edge strip made of a plastic material to a level surface of the fabric under atmospheric pressure;
wherein the edge strip is formed by a dispensing head which applies the plastic material onto the fabric in a controlled manner; and
wherein the dispensing head, by means of which the edge strip is formed, is connected to a movement controller which defines a path of movement of the dispensing head during formation of the edge strip.

23. The method of claim 22, wherein the plastic material is polyurethane.

24. The method of claim 22, wherein the plastic material is elastic.

25. The method of claim 24, wherein the application table has an exposed upper side.

26. A method for producing a functional element of an automobile that can be folded or wound up, comprising the steps of:
providing a fabric that can be folded or wound up;
arranging the fabric on an application table in a level arrangement;
molding at least one edge strip made of a plastic material to the fabric under atmospheric pressure;
wherein the edge strip is formed by a dispensing head which applies the plastic material onto the fabric in a controlled manner;
wherein the dispensing head, by means of which the edge strip is formed, is connected to a movement controller which defines a path of movement of the dispensing head during formation of the edge strip; and
wherein the functional element that can be folded or wound up is a wind deflector element having zones of different hardness by forming the edge strip with a beading made of a hard component on each of a lower edge and an upper edge of the edge strip and a soft component connecting the upper edge and the lower edge.

27. The method of claim 26, wherein the hard component has a hardness between 30 and 50 Shore D and the soft component has a hardness between 50 and 70 Shore A.

* * * * *